F. W. KREMER.
APPARATUS AND METHOD FOR SPLICING RUBBER TUBING.
APPLICATION FILED JULY 19, 1910.
1,078,097.
Patented Nov. 11, 1913.
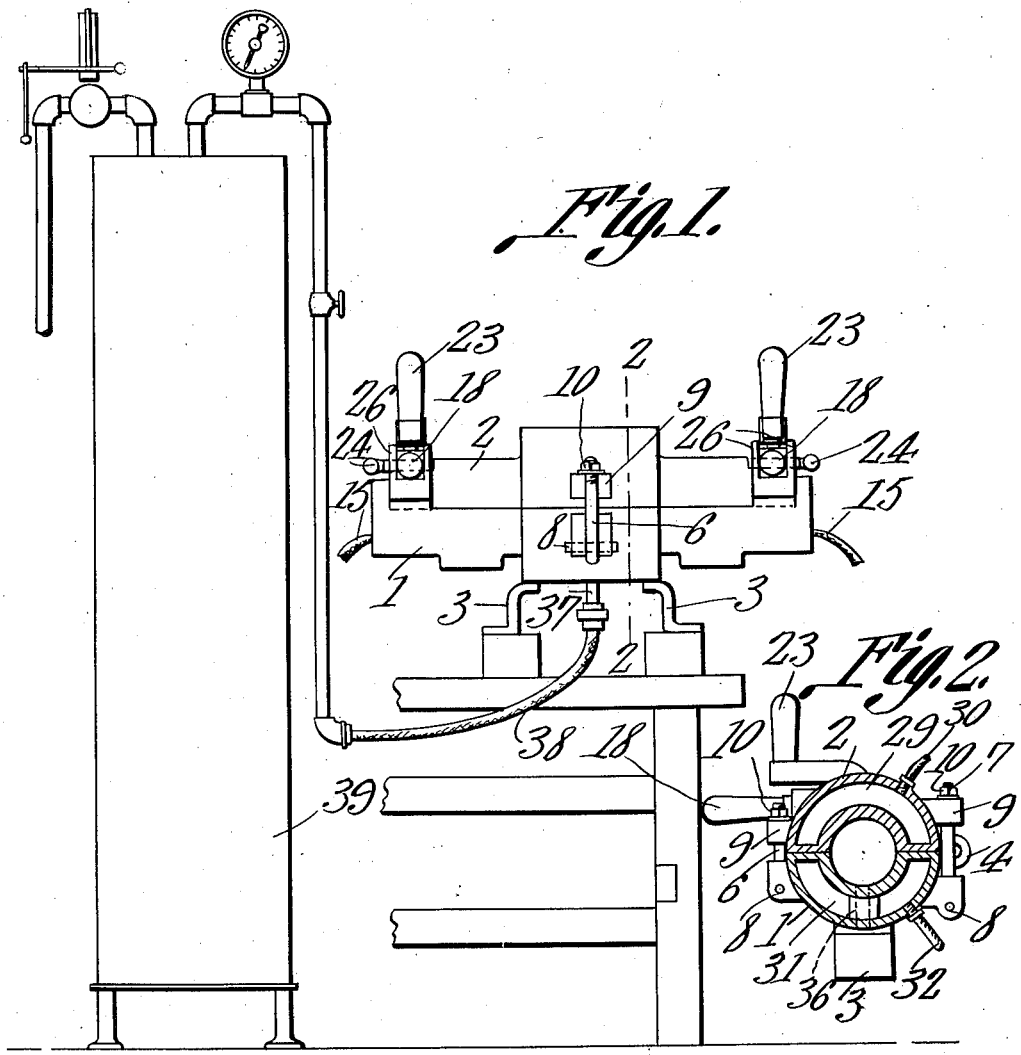
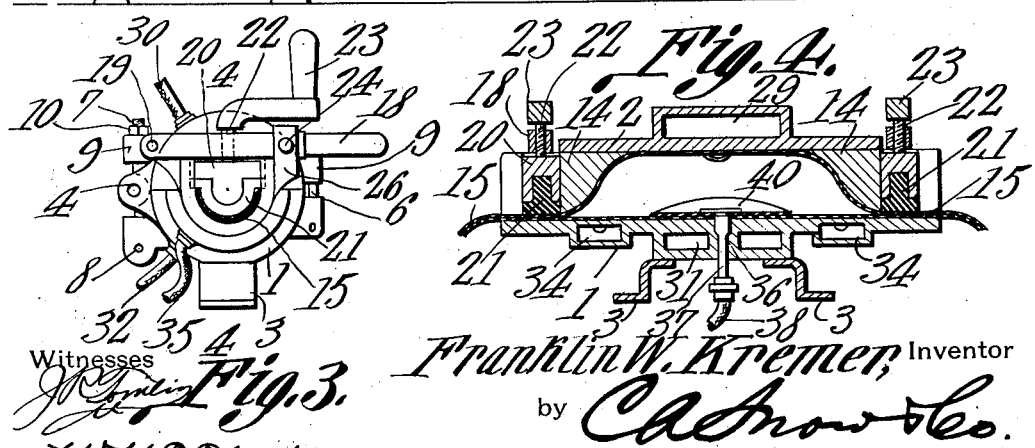
Witnesses
Franklin W. Kremer, Inventor

UNITED STATES PATENT OFFICE.

FRANKLIN WILLIAM KREMER, OF RUTHERFORD, NEW JERSEY.

APPARATUS AND METHOD FOR SPLICING RUBBER TUBING.

1,078,097.  Specification of Letters Patent.  Patented Nov. 11, 1913.

Application filed July 19, 1910. Serial No. 572,725.

*To all whom it may concern:*

Be it known that I, FRANKLIN W. KREMER, a citizen of the United States, residing at Rutherford, in the county of Bergen and State of New Jersey, have invented a new and useful Apparatus and Method for Splicing Rubber Tubing, of which the following is a specification.

This invention relates to methods of splicing or vulcanizing rubber tubes and the like.

In carrying out the process of the present invention, I prefer to join the ends of the tube which is to be spliced, and then inflate either all or a portion of said tube within a suitable mold or confining means and vulcanize the spliced ends while in inflated condition.

According to my present process, the inflating valve and the patch therefor can be located if desired at the point at which the rubber tube is spliced and thus a single vulcanizing operation serves to unite the ends of the tube and to secure the inflating valve in position.

One form of apparatus by means of which the method of the present invention may be carried into effect, is illustrated in the accompanying drawings, in which:—

Figure 1 is a side elevation of a mold suitable for performing the operation of vulcanizing the tube while it is inflated, a suitable pressure tank being shown for use in inflating the tube. Fig. 2 is a transverse vertical section on the line 2—2 of Fig. 1. Fig. 3 is an end elevation of the mold shown in Fig. 1. Fig. 4 is a longitudinal vertical section on the line 4—4 of Fig. 3.

Like reference numerals indicate corresponding parts in the different figures of the drawings.

The mold which is used in carrying out the present invention consists preferably of a lower section 1 and an upper section 2, the lower section being supported upon brackets 3 and the two sections being hinged together in any suitable manner as indicated at 4. Means are provided for locking the upper and lower sections 1 and 2 together when in closed position and this means preferably consists of a pair of rods 6 and 7 hinged at 8 to the lower section of the mold, one of the rods being located on one side of the mold and the other on the other side thereof. The rods 6 and 7 when the two sections of the mold are closed are adapted to be swung up on the pivot 8 so as to engage in between ears or lugs 9 formed on the upper section 2, a nut 10 being provided to lock the rod in engagement with the upper section of the mold.

The upper section 2 of the mold is provided at the ends thereof as shown in Fig. 4 with suitably shaped blocks 14 which serve to provide a chamber of the appropriate shape for the rubber tube 15 to be expanded in during the operation of vulcanizing the joint therein. The upper section of the mold also has pivoted at the end thereof a pair of arms 18 fulcrumed at 19 and carrying a pair of choker blocks 20 each choker block being provided with a rubber buffer 21 to engage the portion of the tube 15 which is to be choked or flattened so as to confine the inflation to one point in the tube. The choker blocks 20 are adjustable toward or away from the arms 18 in any suitable manner such as by means of the screw rods 22 which extend through the arms 18 and are provided at their upper ends with cranks or handles 23, by rotating which the choker blocks 20 and rubber cushions 21 can be adjusted upward or downward with regard to the handles 18. The handles 18 are locked in closed position, preferably by means of pins 24 which extend through pairs of perforated lugs 26 connected in any suitable manner with the lower section 1 of the mold.

The means for heating or vulcanizing the portion of the tube which is to be spliced, preferably consists of a steam chamber 29 formed at the central portion of the upper section 2 of the mold and supplied with steam through a supply pipe 30 and a similar steam chamber 31 formed in the central portion of the lower section 1 and supplied with steam by means of a supply pipe 32.

For the purpose of preventing the heat from the steam chambers 29 and 31 from being communicated to the portions of the tire which are held in flattened positions by means of the rubber cushions 21, cooling chambers 34 are provided in the lower section 1 adjacent the ends thereof as shown in Figs. 3 and 4 said cooling chambers being supplied with water or other suitable cooling means through the supply pipe 35.

The lower mold section 1 is provided with a vertically extending tubular opening 36 through which passes the inflating tube 37 of the tire, said inflating tube being connected by a pipe 38 with the pressure tank 39 for inflating that portion of the rubber tube which is located within the mold. At its upper end the inflating tube 37 is in engagement with the patch 40 which serves to strengthen the rubber tube at the points where the inflating tube 37 is connected therewith.

In carrying out the process of the present invention with the apparatus shown, the ends of the tube which are to be spliced are suitably treated and united either by telescoping or otherwise. The united ends are then placed in the mold and the same is closed, the handles 18 being thrown down in position to choke the ends of the tube. That portion of the tire which is located within the mold is then inflated, the choking block 20 being tightened to any suitable degree to prevent the escape of air from the inflated portion of the tube. By supplying steam to the chambers 29 and 31 and cold water to the chamber 34, the portion of the tube which is being joined is thoroughly vulcanized while the cooling chambers 34 serve to prevent heat from affecting an adherence of the portions of the tube which are pressed together by the choking members 20 and 21.

It will be obvious that the tube is spliced and the inflating valve connection and patch 40 are properly formed at the same time. The necessity of carrying out two operations for splicing the rubber tube and supplying the valve connection is therefore avoided.

The process and apparatus of the present invention are thoroughly efficient and practical for the purpose for which they are intended.

What is claimed as new is:—

1. A step in the manufacture of inner tubes which consists in splicing the ends of the tube, securing the inflating valve and patch in position choking the tube on opposite sides of the patch, inflating the tube between the choked portion and vulcanizing the inflated portion.

2. A vulcanizing apparatus comprising an inflating chamber, means for choking a rubber tube at the ends of the chamber, a heating chamber around the inflating chamber, cooling means adjacent the choking means, and means for inflating that portion of the tube which is in the inflation chamber.

3. A method of splicing rubber tubing which consists in fitting together the ends of the tubing to be spliced, choking the tubing on opposite sides of the point to be spliced, inflating the tube between the choked portions thereof, and vulcanizing the inflated portion of the tube.

4. Apparatus for vulcanizing rubber tubes, provided with an inflation chamber; means for choking the tube transversely of the ends of said chamber; and a heating chamber surrounding the inflation chamber.

In testimony that I claim the foregoing as my own, I have hereto affixed my signature in the presence of two witnesses.

FRANKLIN WILLIAM KREMER.

Witnesses:
 J. A. MILLER,
 ARTHUR C. WESCOTT.